US012011415B2

(12) United States Patent
Restiano et al.

(10) Patent No.: US 12,011,415 B2
(45) Date of Patent: Jun. 18, 2024

(54) MOBILIZATION TOOL PERSONAL CARE BAR

(71) Applicant: SORSOAP LLC, Brick, NJ (US)

(72) Inventors: David Restiano, Brick, NJ (US); Daniel P. Staats, Point Pleasant, NJ (US); Alfred Colantoni, Jr., Wall, NJ (US)

( * ) Notice: Subject to any disclaimer, the term of this patent is extended or adjusted under 35 U.S.C. 154(b) by 669 days.

(21) Appl. No.: 16/832,587

(22) Filed: Mar. 27, 2020

(65) Prior Publication Data

US 2021/0093503 A1 Apr. 1, 2021

Related U.S. Application Data

(60) Provisional application No. 62/908,700, filed on Oct. 1, 2019.

(51) Int. Cl.
*A61H 7/00* (2006.01)

(52) U.S. Cl.
CPC ..... *A61H 7/001* (2013.01); *A61H 2201/0153* (2013.01); *A61H 2201/105* (2013.01)

(58) Field of Classification Search
CPC ..... C11D 9/00; C11D 17/0047; C11D 17/006; C11D 17/0034; C11D 13/14; C11D 13/00; C11D 15/00; C11D 17/00; C11D 17/0095; C11D 17/0056; A61H 7/001; A61H 2201/0153; A61H 2201/105; A61H 7/003; A61H 2201/102
USPC .............................................. 401/88; 510/449
See application file for complete search history.

(56) References Cited

U.S. PATENT DOCUMENTS

| | | | | | |
|---|---|---|---|---|---|
| 1,587,279 | A * | 6/1926 | Clarence | C11D 17/00 510/148 |
| 4,746,452 | A * | 5/1988 | Marek | C11D 17/00 510/148 |
| 5,071,583 | A * | 12/1991 | Martell | C11D 17/00 401/88 |
| D392,771 | S * | 3/1998 | Mohary | D28/8.1 |
| D397,507 | S * | 8/1998 | Bern | D28/8.1 |
| 6,887,211 | B1 | 5/2005 | Sevier et al. | |
| 8,623,803 | B2 * | 1/2014 | Gelin | A61Q 19/10 510/141 |
| 8,801,642 | B1 | 8/2014 | Slominski | |
| 9,023,078 | B2 | 5/2015 | Dehors | |
| 9,700,480 | B2 | 7/2017 | Fiore | |
| 10,111,725 | B2 * | 10/2018 | van den Dries | A61B 50/31 |
| 10,434,032 | B2 | 10/2019 | Ghosh et al. | |
| 10,813,824 | B2 * | 10/2020 | van den Dries | A61H 7/003 |
| 2007/0191745 | A1 | 8/2007 | Tucker | |
| 2007/0270322 | A1 * | 11/2007 | Pak | C11D 17/0047 510/141 |

(Continued)

OTHER PUBLICATIONS

Salt Leaf CBD Massager Product Sheet.

(Continued)

*Primary Examiner* — Samchuan C Yao
*Assistant Examiner* — Tina Zhang
(74) *Attorney, Agent, or Firm* — Florek & Endres PLLC

(57) ABSTRACT

A solid bar comprising a personal care composition and having at least one working feature for soft tissue mobilization, the working feature being a structural feature as found on a physical therapy soft tissue mobilization tool that is adapted to mobilize soft tissue.

10 Claims, 6 Drawing Sheets

(56) References Cited

U.S. PATENT DOCUMENTS

| | | | | |
|---|---|---|---|---|
| 2009/0192070 | A1* | 7/2009 | Feng | C11D 13/14 510/449 |
| 2014/0213944 | A1* | 7/2014 | Kojima | A61H 7/003 434/262 |
| 2017/0181934 | A1* | 6/2017 | Khamis | A47K 5/04 |
| 2019/0008716 | A1* | 1/2019 | Giddings | A61H 7/003 |

OTHER PUBLICATIONS

The Edge Mobility System, Edge Mobility Tool, http://www.edgemobilitysystem.com/collections/best-sellers/products/edge-mobility-tool.
Rock Tape, Rockblades 2.0—Complete Soft Tissue IASTM System, http://shop.rocktape.com/rockblades-2-0-complete-soft-tissue-iastm-system/.

* cited by examiner

MOBILIZATION TOOL PERSONAL CARE BAR

FIELD OF THE INVENTION

The present invention relates to the fields of mobilization tools and personal care bars, such as bar soaps, including surfactants, lotions, balms, emollients, oils, creams, sun screens and the like.

BACKGROUND OF THE INVENTION

Hand held soft tissue mobilization or manipulation tools, sometimes referred to as Graston tools, hereinafter "mobilization tools," are known to physical therapists for treating a variety of physical issues. These mobilization tools are sometimes described as for the practice of the ancient gua sha principals as well as for modern physical therapy modalities.

Some commercial examples of mobilization tools currently known in the art include the RODEREK IASTM Therapy Tool, the EDGE Mobility Tool, MYOFASCIAL TOOLS Stainless Steel Multipurpose IASTM Tool, the STICKON' IASTM Tool (G Shape), the EDGEility plastic tool by EDGE Mobility, and the STARR tool. Additional examples of mobilization tools are shown in FIG. 1, including mobilization tools that come in different shapes and sizes for mobilizing and manipulating soft tissue in different areas, for mobilizing and manipulating different types of soft tissue, based on the personal preference of the user, etc.

Mobilization tools are also the subject of various patents and published patent applications. Variations are shown and described in U.S. Pat. Nos. 6,887,211, 8,801,642, 9,023,078, 9,700,480, and 10,434,032. Other variations are found in US Patent Application Publication Nos. US2006/0004312, US2006/0247563, 2007/0191745, US2016/0166459, US2018/0333323, US2018/0338884, and US2019/0008716, and the like, with such devices generally found in U.S. Patent Classification A61H7/001 and A61H7/003.

Known soft tissue mobilization tools are generally made of stainless steel, aluminum, plastic, stone (jade) or combinations thereof. Soft tissue mobilization tools made of these materials are most often used with a lubrication and/or emollient applied to the skin surface in the treatment area as lubrication for facilitating movement of the mobilization tool across the user's skin. All such lubricating compositions and materials will be referred to herein as "lotions."

Some of the common conditions treated with mobilization tools include ankle pain (Achilles tendinosis/itis), wrist pain (carpal tunnel syndrome), neck pain (cervical sprain/strain), fibromyalgia, hamstring injuries, hip pain, IT Band (Iliotibial Band), tennis elbow (lateral epicondylosis/itis), back pain (lumbar sprain/strain), golfer's elbow (medial epicondylosis/itis), knee pain (patellofemoral disorders), heel pain (plantar fasciitis), shoulder pain (rotator cuff tendinosis/itis), general muscle pain and soreness, scar tissue, trigger finger, women's health issues (post-mastectomy and caesarean scarring), to name a few.

The present invention seeks to make soft tissue mobilization tools more accessible and easier to use by the person on which the mobilization tool is being used.

SUMMARY OF THE INVENTION

The present invention is directed to a solid bar made of a personal care composition, preferably comprising a soap composition and having at least one working feature for soft tissue mobilization. As used here, "working feature" refers to a structural feature as is found on a physical therapy soft tissue mobilization tool that is adapted to mobilize soft tissue.

The preferred solid bar has two or more surfaces, or faces, each surface having a periphery including a first end, a second end and a body between said ends, one or more sides extending between said ends at the periphery of the surfaces, and two or more corners, the corners being at changes of direction in the surface of the solid bar. Most preferably, the solid bar comprises opposed first and second surfaces with a side about the periphery between said first and second surfaces. The first and second surfaces preferably include a number of corners forming nubs at the transition between adjacent peripheral edges of the surfaces.

Preferably, the solid bar has at least one peripheral section comprising a concave edge and at least one peripheral section comprising a convex edge. More preferred, the solid bar has at least two concave or convex peripheral portions, with two concave and two convex peripheral portions being most preferred.

It is also preferred that the solid bar has at least one acute corner, where the angle of the corner is less than 90 degrees, and/or at least one obtuse corner, where the angle of the corner is greater than 90 degrees. Notwithstanding the angle, it is understood that the corners may be, and are preferably, at least partially rounded.

Additionally, the preferred solid bar has at least one beveled section, comprising an angled transition associated with one or more sides. The beveled section may comprise two opposed bevels on the side between the front surface and the rear surface, so that the two bevels form an obtuse angle, or a single bevel. The single bevel can be either across the entire side between the front surface and the rear surface or, most preferably, on only a portion of the side and including both a portion at a substantially 90 degree angle from one of the front surface and the rear surface and a portion comprising a bevel to the other surface.

The solid bar can have any suitable dimensions, but preferably has a length dimension from one end to the other of about 4 to 15 cm, and more preferably from about 8 to 12 cm, a height dimension of from about 4 to 12 cm, and more preferably from about 6 to 8 cm, and a depth dimension of from about 1 to 4 cm, and more preferably from about 1.5 to 3 cm. The most preferred dimensions are a length of about 9 to 10 cm, a height of about 7 cm and a depth of about 2 cm.

In a preferred embodiment, the solid bar has at least one aperture extending between the first and second surfaces to assist in controlling the solid bar during soft tissue mobilization. It is preferred that the size and shape of the aperture conforms to one or more of the user's fingers, to permit the user to engage the aperture with one or up to four fingers extending through the aperture to securely grasp the solid bar.

The personal care composition is preferably erodible so that the active nature wears over time, and most preferably a soap composition that preferably includes a surfactant, generally a fat and/or oil, including but not limited to coconut oil, palm oil, tallow, and/or lard, and is preferably formulated to maintain its structural integrity and resist dissolving in water. Therefore, the shape of the solid bar, while changing over use, will preferably maintain the essence of the working feature for a period of time. Preferably, the soap composition also comprises one or more ingredients taken from the group of a fragrance, an essential oil, an exfoliate, a moisturizer, a medicament, a CBD, etc. It can be all natural, organic, vegan, hypo-allergenic and/or conforming to other standards, as desired.

For example, a solid bar made from 1%-5% menthol in a soap base of palm oil and other traditional soap ingredients is anticipated to have a beneficial effect for the user. Additional ingredients, such as a CBD for reducing inflammation, can be added to the composition to further treat related conditions.

The use of a soap composition for the solid bar having working features affords a synergistic effect by providing a tool for soft tissue mobilization and creating its own lubrication during use with water, as well as providing a cleaning function. Moreover, the use of fragrance in the soap composition provides an aromatherapy effect from the bar itself, eliminating the need for providing a separate scent for relaxation, stimulus, etc.

Accordingly, the preferred solid bar of the present invention is well suited for use by individuals in a shower or bath environment, allowing the user to mobilize soft tissue, especially for sore muscle recovery. During such use, the user can, for example, treat sore muscle tissue using the solid bar without the need for extra lubricants or aromatherapy scents, while cleaning themselves, making it well suited for use after a workout or participation in a sporting activity.

Of course, the solid bar need not conform identically to the shape and dimensions of a mobilization tool, but is expected to have at least one working feature, and preferably two, three or more working features, of a mobilization tool. For example, the solid bar may be formed with an increased thickness over known mobilization tools, thus providing improved structure for a solid bar comprised of a soap composition that wears during use. The preferred shape also has a broad beveled edge allowing for a larger surface area of the skin to be treated with each stroke.

The working features found on the solid bar may include one or more of a teardrop shape portion extending from a portion, a tapered converging edge, and preferably a curved tapered converging edge, a converging opening where the sides of the opening diverge toward terminal ends, such as v-shaped notch, a bulbous extending portion, an inwardly arced portion, an elliptical shaped thumb cup, a generally triangular flattened blade, a levered pressure surface component, a massage edge, a blade edges, a disc edge, a pressure knob, a finger arc blade edge, a stripper, an adhesion release blade edge, a tendon release blade edge, a forearm arc blade edge, etc.

Preferably, an aperture is formed through the body of the solid bar, creating a handle to grasp the solid bar adjacent or opposite a working feature, for efficient application of the working feature by the user.

BRIEF DESCRIPTION OF THE DRAWINGS

The present invention will be better understood when considered in view of the attached drawings, in which like reference characters indicate like parts. The drawings, however, are presented merely to illustrate the preferred embodiments of the invention without limiting the invention in any manner whatsoever.

DETAILED DESCRIPTION OF THE PREFERRED EMBODIMENT

Figure 1:
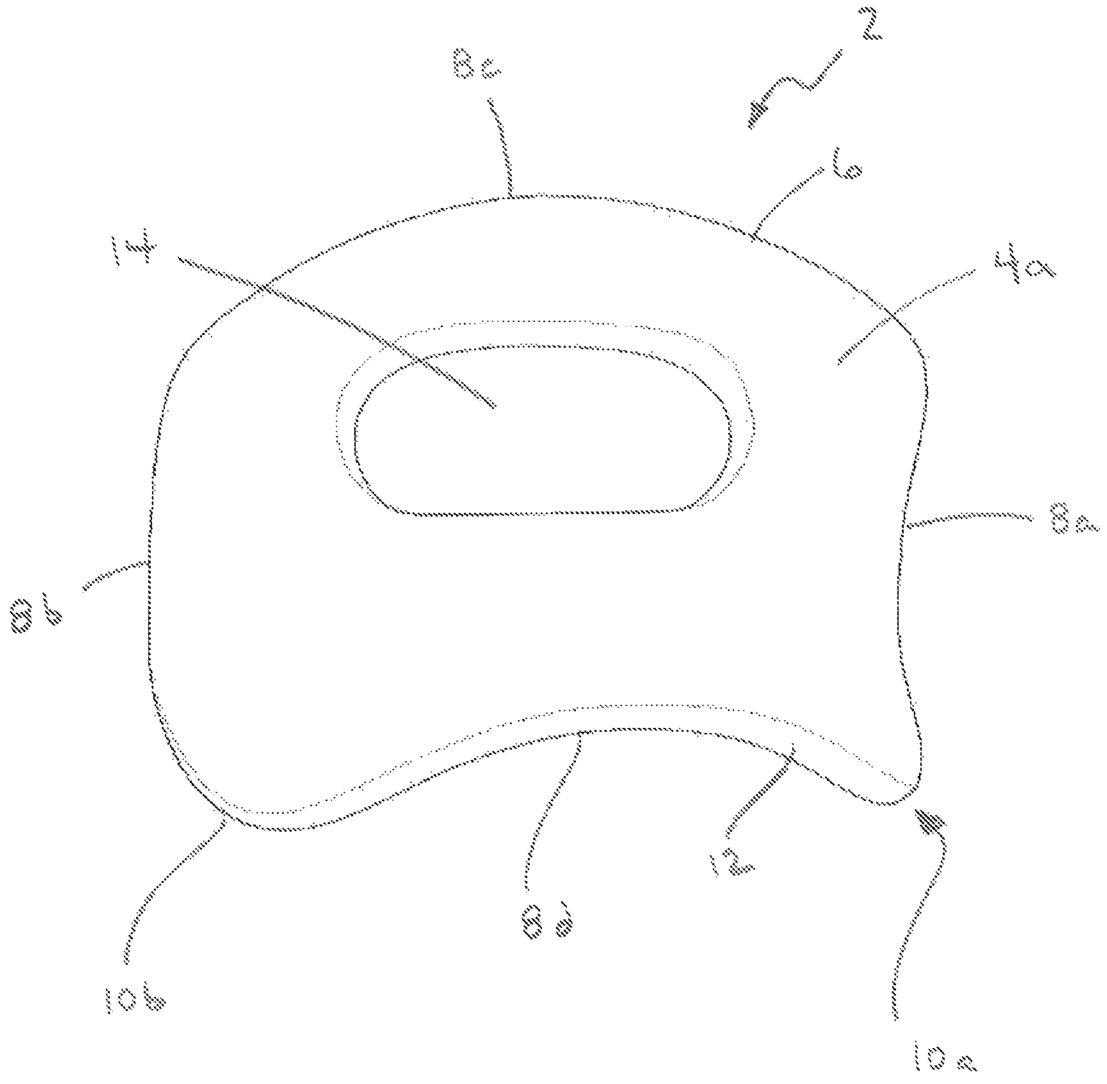
FIG. 1 is a front elevation of the preferred embodiment of the solid bar of the present invention.
Figure 2:
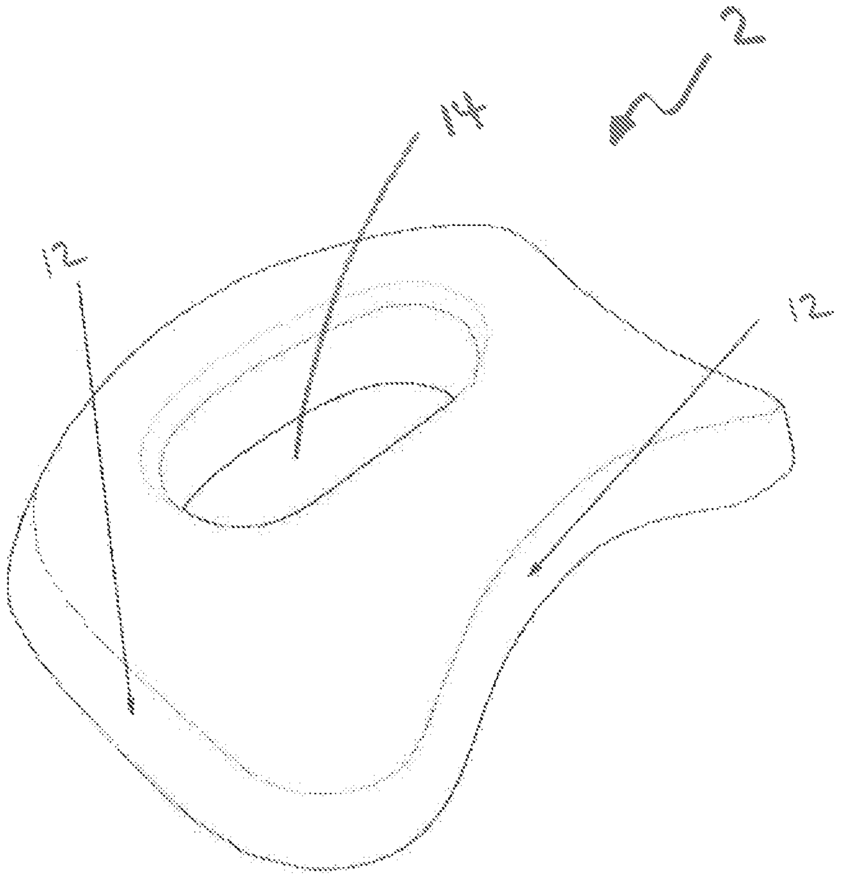
FIG. 2 is a perspective view of the preferred embodiment of the solid bar of the present invention shown in FIG. 1.
Figure 3:
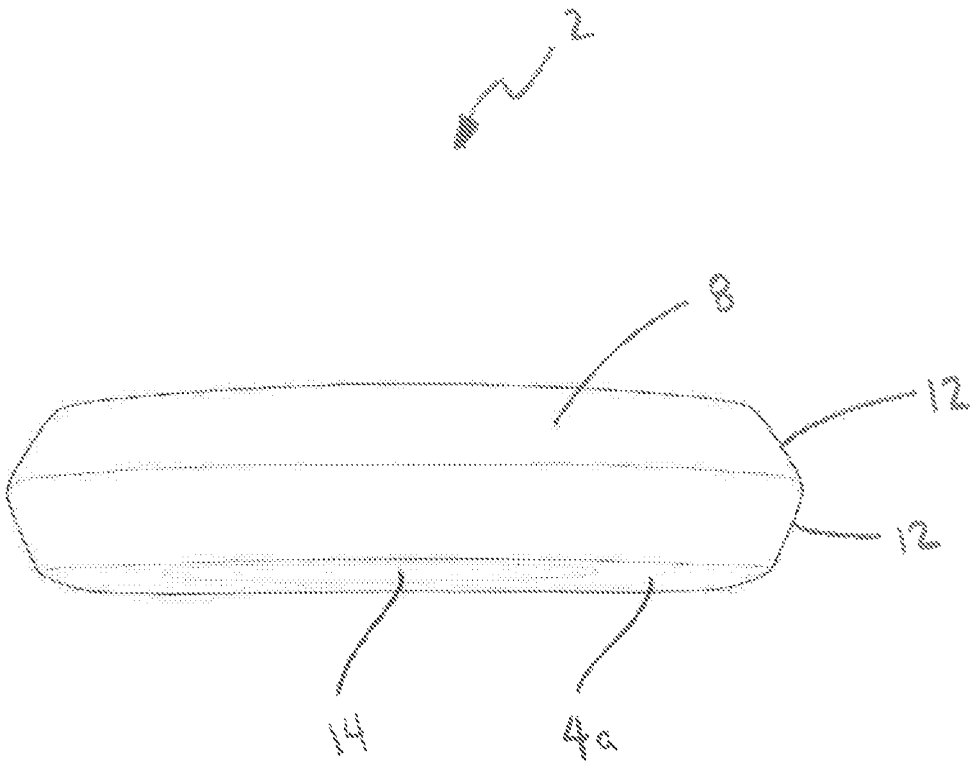
FIG. 3 is a top plan view of the preferred embodiment of the solid bar of the present invention shown in FIG. 1.
Figure 3A:
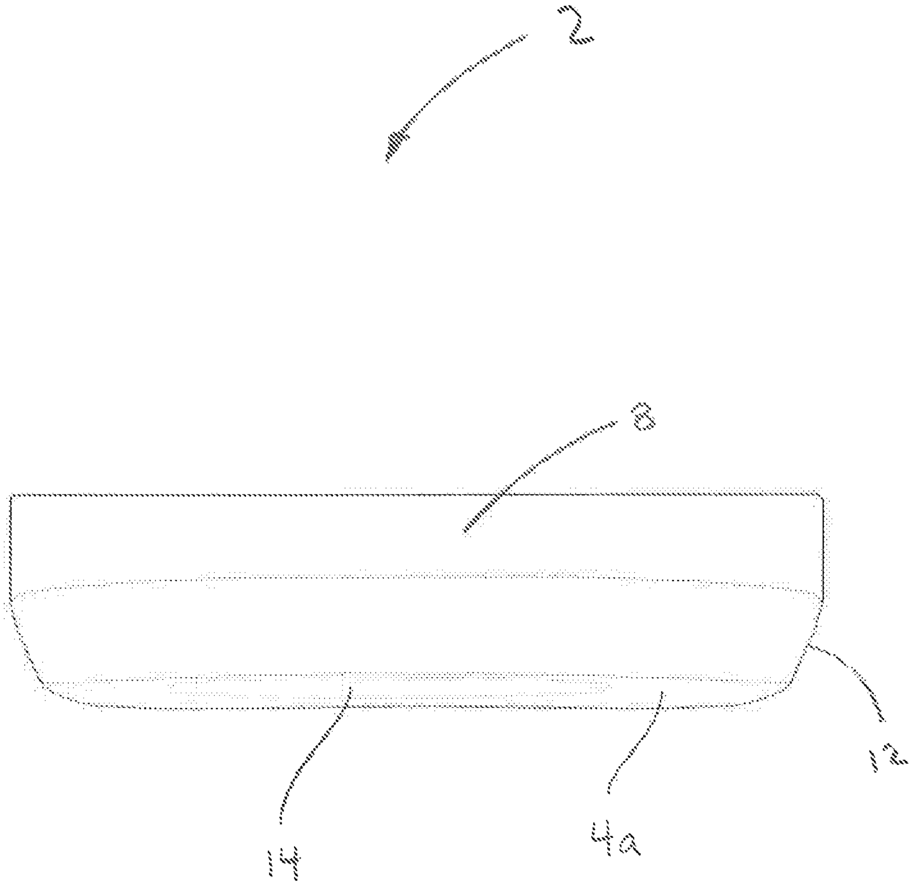
FIG. 3A is a top plan view of an alternative embodiment of the solid bar of the present invention.
Figure 4:
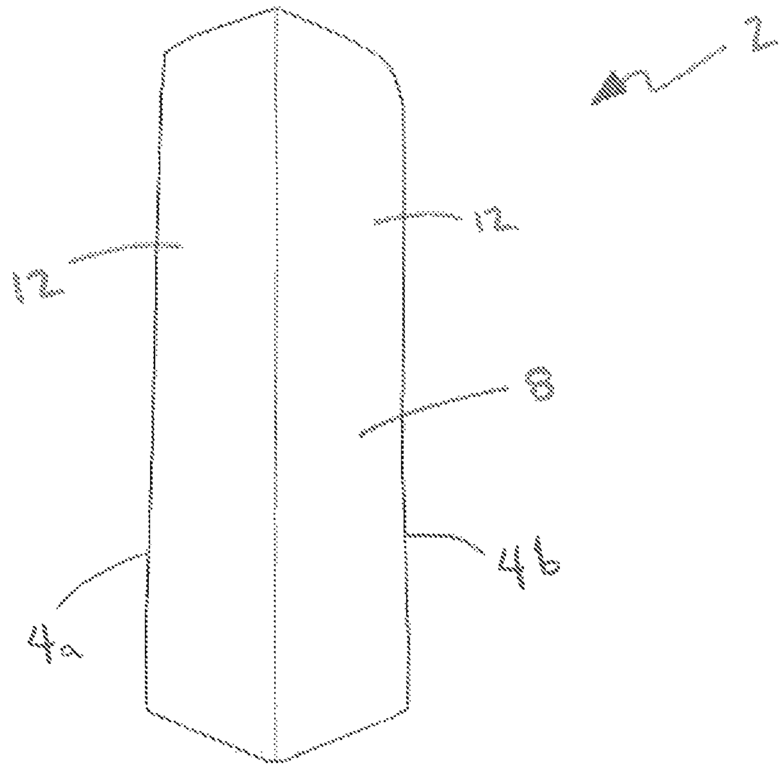
FIG. 4 is a side elevation of the preferred embodiment of the solid bar of the present invention shown in FIG. 1.
Figure 4A:
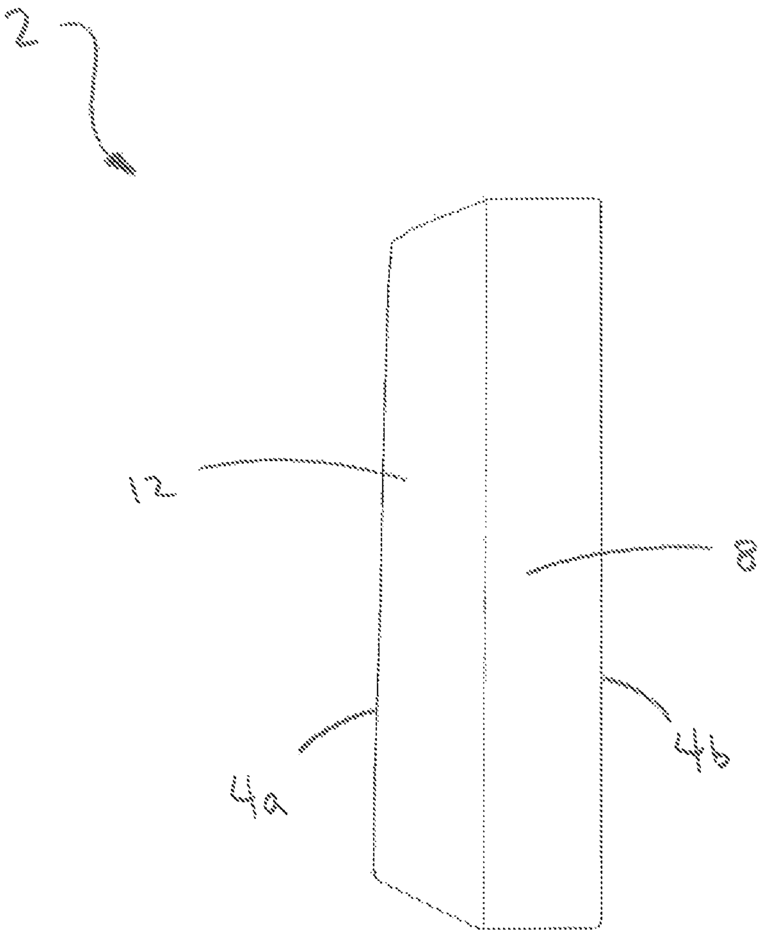
FIG. 4A is a side elevation of an alternative embodiment of the solid bar of the present invention.

The following description of the preferred embodiment is presented to describe the present invention without limiting the scope of the invention.

The present invention is directed to a solid bar 2 comprising a soap composition having at least one working feature for soft tissue mobilization. In the preferred embodiment shown in FIGS. 1-4, various corners and edges of the solid bar 2 are designed for acting on various body parts.

The preferred solid bar 2 has opposed front and rear surfaces 4, each surface 4 comprising a body having a periphery 6 with a first end, a second end, a top and a bottom. The ends, top and bottom of the preferred solid bar 2 correspond to four sides 8 including a left side 8*a*, a right side 8*b*, a top side 8*c* and a bottom side 8*d*, the sides 8 extending between said front surface 4*a* and rear surface 4*b*, providing a depth. As will be more fully described later, one or more of the sides 8 comprise working features of the solid bar 2.

In the preferred embodiment shown, the solid bar 2 has four sides 8 and four corners 10, the corners 10 being at changes of direction in the sides 8 of the solid bar 2 to form nubs that may comprise working features of the solid bar 2. It is understood that the corners 10 may be rounded rather than sharp, and that the angles of the corners 10 are based on the surfaces of the sides 8 adjacent any rounded feature of the corner 10. One or more of these corners 10 comprise working features of the solid bar 2.

Preferably, the solid bar 2 has at least one peripheral section comprising a concave edge and at least one peripheral section comprising a convex edge. More preferred, the solid bar 2 has at least two concave or convex peripheral portions, with two concave and two convex peripheral portions being most preferred. As shown in FIG. 1, the left side 8*a* and the bottom side 8*d* comprise concave peripheral portions and the right side 8*b* and top side 8*c* comprise convex peripheral portions.

The preferred solid bar 2 has at least one acute corner 10*a*, where the angle of the corner is less than 90 degrees, and at least one obtuse corner 10*b*, where the angle of the corner is greater than 90 degrees. In the most preferred embodiment shown in the drawings, the solid bar 2 has two acute corners 10*a* and two obtuse corners 10*b*, although it is understood that 90 degree corners and solid bars 2 with more or less than four sides may have a different number of corners with acute, obtuse or right angles. Moreover, notwithstanding the angle, it is understood that the corners 10 may be, and preferably are, at least partially rounded.

Additionally, the preferred solid bar 2 has at least one side 8 that comprises a bevel 12, comprising an angled transition associated with one or more portions. In an embodiment shown in FIGS. 3 and 4, the bevel 12 divides the side 8 between the front and rear surfaces, so that the side 8 comprises two bevels 12 forming an obtuse angle. The side is shown as divided in the middle, however, any suitable division between the front 4*a* and rear 4*b* surfaces may be used. In an alternative embodiment, the side is divided between a 90 degree portion, relative to the front or rear surface, and a beveled portion 12. Again, the side is shown as divided at about the middle, however, any suitable division between the front 4*a* and rear 4*b* surfaces may be used.

In a preferred embodiment, the solid bar 2 has at least one aperture 14 extending between the front surface 4*a* and rear surface 4*b* to assist in controlling the solid bar 2 during soft tissue mobilization. It is preferred that the size and shape of the aperture 14 conforms to one or more of the user's fingers, to permit the user to engage the aperture 14 with one or up to four fingers extending through the aperture 14 to securely grasp the solid bar 2. As shown in the drawings, the preferred aperture 14 is positioned adjacent a peripheral edge of the solid bar 2, preferably adjacent the top side 8*c*, to permit the user to place multiple fingers through the aperture 14 and have the palm of the hand rest against the adjacent side 8 of the solid body 2.

The benefits of the above described features are known to those skilled in the physical therapy art. In this regard, the preferred beveled edge 12, including a double beveled edge or a 90 degree beveled edge, allows for greater soft tissue activation, to aid in release of fascial restrictions. The greater activation on the soft tissue allows for shorter treatment times. Release of fascial restrictions lead to optimal muscle functioning.

The preferred concave sides 8*a* and 8*d* are directed toward global adhesions and general muscle aches. The convex sides 8*b* and 8*c* are more aggressive and are geared towards localized specific adhesions and trigger points. The different sizes of both convex and concave edges are geared toward different size body parts. For example, the smaller convex side 8*a* can be used for a small localized area such as the plantar fascia. The larger concave side 8*d* can be used for global adhesions on the Quadriceps or other large muscle groups.

In a preferred embodiment, the soap composition of the solid bar 2 contains 1-5% Menthol, which has also been proven to decrease pain perception on a Visual Analog scale superior to ice. The combination of the shape and ingredients of the solid bar 2 are designed to relieve fascial adhesions and muscular trigger points while at the same time creating a safe, therapeutic analgesic effect. This will allow for optimal healing and overall muscle recovery.

The preferred soap composition of the solid bar 2 may also, or alternatively, comprise one or more essential oils, aromatherapy ingredients, CBD, moisturizers, etc., which work in conjunction with the IASTYM methodology to promote improved circulation, stimulation of neurologic pathways, health benefits, etc.

In the most preferred embodiment, each side 8 and corner 10 of the solid bar 2 can be utilized on the body.

Even after the solid bar 2 is used for its intended shelf life, when it inevitably breaks into two smaller pieces as a bar of soap is inclined to do, the two smaller pieces can still be individually utilized effectively on the forearm and hands, fingers, neck and any other smaller areas. Moreover, small pieces of the soap of the solid bar 2 left after soft tissue mobilization is no longer effective can still be used for massaging into the muscles by hand and for cleaning and aromatherapy effects.

In addition to being the natural handle, the convex top edge 8*c* of the solid bar 2 can be used like a rounded tool to work on larger muscle groups and body parts such as the calves, quadriceps and arms. The bottom concave beveled edge 8*d* of the solid bar 2 can be the primary part of the tool, anticipated to last the longest based on normal expected wear pattern. This edge 8*d* can be very useful on all muscle groups.

The acute nub or corner 10*a* on the bottom right side of the solid bar 2 shown in the drawings is intended to be used on knotted muscles and trigger points on the body in the feet, neck, hands, forearms, shoulders, etc. The slightly larger acute corner 10*b* on the bottom left side of the solid bar 2 is intended to be used on knotted muscles and trigger points on the body in the legs, neck, hands, forearm, shoulders, etc. The concave side right side 8*a* of the solid bar 2 is intended to be used in the same fashion as the concave bottom side 8*d*, but can be utilized for slightly smaller muscle areas in the calves, arms and forearms.

The solid bar 2 can have any suitable dimensions, but preferably has a length dimension from one end to the other of about 4 to 15 cm, and more preferably from about 8 to 12 cm, a height dimension of from about 4 to 12 cm, and more preferably from about 6 to 8 cm, and a depth dimension of from about 1 to 4 cm, and more preferably from about 1.5 to 3 cm. The most preferred dimensions of the solid bar 2 are a length of about 9 to 10 cm, a height of about 7 cm and a depth between front surface 4*a* and rear surface 4*b* of about 2 cm.

The solid bar 2 can be used in the shower as part of one's bathing routine. A customer will take solid bar 2 and lather it up. It will immediately release the essential oils into the air, and the CBD, menthol, lavender oil, Roman chamomile or other active ingredients will begin being absorbed into the skin. Using downward strokes, at an appropriate angle, the user can repeatedly work the affected muscle area. After about 1-2 minutes the user can use the solid bar 2 to cleanse or otherwise treat other parts of their body.

For example, a competitive soccer player with a sore right hip flexor can enter a warm shower, grasp the solid bar 2 by the top handle formed in connection with aperture 14 and proceed to use a downward motion on the affected area. Employing about 25-50 strokes using the leading concave side 8*d* with a bevel 12 to break up the myofascial adhesions in the hip flexor, the user feels immediate relief from the combined action of the essential oils/menthol and longer term palliative response from the anti-inflammatory effects of the CBD. The muscle fiber can now recover more quickly.

The solid bar 2 of the present invention takes the concept of soft-tissue mobilization therapy and blends it with a soap and/or personal care product to treat soft tissue dysfunction and provide preventative, proactive manual therapy. This aids in the user's relaxing tense muscles, reducing scar tissue, stretching fascia, lengthening fascia, cleaning skin, creating an aromatherapy response to promote health and wellness, reducing inflammation, etc.

While certain exemplary embodiments have been described and shown in the accompanying drawings, it is to be understood that such embodiments are merely illustrative and do not limit the current invention. Accordingly, this invention is not restricted to the specific constructions and arrangements shown and described since variation, modification, and/or alternatives can occur to those ordinarily skilled in the art. All such variations, modifications and/or alternatives are intended to fall within the scope of the present invention, and all patents, patent application publications, and references cited herein are hereby incorporated by reference.

The term "comprising" as used in the following claims is an open-ended transitional term that is intended to include additional elements not specifically recited in the claims. It is also noted that any feature or element positively identified in this document may also be specifically excluded as a feature or element of an embodiment of the present invention.

The invention claimed is:

1. A solid bar comprising a soap composition, wherein the solid bar is entirely configured from the soap composition, said solid bar comprising a plurality of working features configured for activation of soft tissue and a handle comprising a single aperture extending completely between a front surface and a rear surface, the aperture configured to allow one or more fingers of a user pass therethrough to control the bar during soft tissue mobilization, wherein the plurality of working features of the front surface consists of four corners and four sides;

wherein two corners are formed of an obtuse angle, two corners are formed of an acute angle, each of the two sides are formed in a concave shape and each of the two sides are formed in a convex shape;

further wherein the aperture of the handle aligns with and is positioned closer to one of the two sides formed in a convex shape which is opposite one of the two sides formed in a concave shape.

2. The solid bar of claim 1 wherein the soap composition comprises a surfactant.

3. The solid bar of claim 1 wherein the soap composition comprises a lubricant and an emollient.

4. The solid bar of claim 1 wherein the soap composition comprises a fragrance.

5. The solid bar of claim 1 wherein the soap composition comprises a medicament.

6. The solid bar of claim 1 wherein the plurality of working features further comprises an at least partially bevelled side.

7. The solid bar of claim 1 wherein the plurality of working features comprises at least one bevelled edge between the front surface and the rear surface.

8. The solid bar of claim 6 wherein the at least partially bevelled side comprises one or more of:

a double bevelled side, and a side with both a 90 degree portion and a bevelled portion.

9. The solid bar of claim 1 wherein the aperture of the handle comprises a slot with rounded ends.

10. The solid bar of claim 7 wherein the bevelled edge comprises at least one of:

a double bevelled side, and a side with both a 90 degree portion and a bevelled portion.

* * * * *